(12) United States Patent
Eberhart

(10) Patent No.: US 9,027,275 B2
(45) Date of Patent: May 12, 2015

(54) ROPE GAFF (COLLAPSIBLE)

(71) Applicant: James Lee Eberhart, Toledo, IA (US)

(72) Inventor: James Lee Eberhart, Toledo, IA (US)

(*) Notice: Subject to any disclaimer, the term of this patent is extended or adjusted under 35 U.S.C. 154(b) by 300 days.

(21) Appl. No.: 13/595,941

(22) Filed: Sep. 17, 2012

(65) Prior Publication Data

US 2014/0077512 A1 Mar. 20, 2014

(51) Int. Cl.
*A01K 97/14* (2006.01)
*A01K 97/24* (2006.01)

(52) U.S. Cl.
CPC .................. *A01K 97/14* (2013.01)

(58) Field of Classification Search
CPC ........ A01K 97/24; A01K 97/14; B63C 11/48; B63C 11/50
USPC ........... 43/5, 17.2; 294/19.3, 66.1, 86.1, 87.1, 294/86.4
See application file for complete search history.

(56) References Cited

U.S. PATENT DOCUMENTS

| | | | | |
|---|---|---|---|---|
| 1,049,875 A | * | 1/1913 | Krueger | 43/5 |
| 1,148,740 A | * | 8/1915 | Batla | 43/5 |
| 1,758,149 A | * | 5/1930 | Dilworth | 294/66.1 |
| 1,797,251 A | * | 3/1931 | Tyrrell | 43/5 |
| 1,958,514 A | * | 5/1934 | Hope | 43/17.2 |
| 1,982,132 A | * | 11/1934 | Boles | 43/5 |
| 2,210,271 A | * | 8/1940 | Thwaits | 43/5 |
| 2,235,371 A | * | 3/1941 | Jyrkas | 43/5 |
| 2,482,037 A | * | 9/1949 | Swaim | 43/17.2 |
| 2,493,100 A | * | 1/1950 | Adams, Jr. | 43/17.2 |
| 2,676,430 A | * | 4/1954 | Richard | 43/17.2 |
| 2,764,833 A | * | 10/1956 | Clark | 43/17.2 |
| 2,801,489 A | * | 8/1957 | Gehring | 43/17.2 |
| 2,873,997 A | * | 2/1959 | Thomas | 294/66.1 |
| 2,879,618 A | * | 3/1959 | Kirkland, Jr. | 43/17.2 |
| 3,095,662 A | * | 7/1963 | Puckett | 43/5 |
| 3,123,930 A | * | 3/1964 | Rimar | 43/5 |
| 3,163,955 A | * | 1/1965 | Lockwood | 43/17.2 |
| 3,191,335 A | * | 6/1965 | Sobetzer | 43/17.2 |
| 3,246,415 A | * | 4/1966 | Forbes | 43/17.2 |
| 3,267,603 A | * | 8/1966 | Josephs et al. | 43/5 |
| 3,296,730 A | * | 1/1967 | Leverdingen | 43/17.2 |
| 3,336,067 A | * | 8/1967 | Cloyd | 43/17.2 |
| 3,375,601 A | * | 4/1968 | Matthews | 43/5 |
| 3,464,138 A | * | 9/1969 | Lindner | 43/17.2 |
| 3,477,163 A | * | 11/1969 | O'Connell et al. | 43/5 |
| 3,526,053 A | * | 9/1970 | Matthews | 43/5 |
| 3,550,303 A | * | 12/1970 | Western | 43/17.2 |
| 3,601,920 A | * | 8/1971 | Mason, Jr. | 43/5 |
| 3,688,429 A | * | 9/1972 | Mauck | 43/17.2 |
| 3,694,952 A | * | 10/1972 | Matthews | 43/5 |
| 3,729,854 A | * | 5/1973 | Satama | 43/17.2 |
| 3,772,815 A | * | 11/1973 | Burgess | 43/17.2 |
| 3,987,573 A | * | 10/1976 | Clayton | 43/17.2 |
| 4,085,537 A | * | 4/1978 | Todd | 43/17.2 |
| 4,292,753 A | * | 10/1981 | Yesuratnam | 43/5 |
| 4,394,040 A | * | 7/1983 | Marzka | 294/66.1 |
| 4,467,547 A | * | 8/1984 | Chabot | 43/17.2 |
| 5,485,696 A | * | 1/1996 | Barton | 43/17.2 |
| 6,705,039 B1 | * | 3/2004 | Campbell | 43/5 |

* cited by examiner

*Primary Examiner* — Darren W Ark

(57) ABSTRACT

A fully collapsible, double articulated gaff for retrieving fish when fishing from high bridges, piers and high banks. The device collapses to approximately 5 inches in diameter by 1 inch high to enable it to be carried in a tackle box. It has three double articulated, weighted gaff hooks. The fishing line is threaded thru the overlap in guide mechanism, then lowered to the fishes head gripping it with the gaff hooks, then by pulling up on the rope lifting the device and the fish. Materials and method of construction used to help reduce manufacturing cost.

3 Claims, 1 Drawing Sheet

ROPE GAFF (COLLAPSIBLE)

BACKGROUND OF THE INVENTION

The invention is for a rope gaff which is designed to alleviate problems with respect to landing fish when fishing from piers, bridges, and other high places, where other retrieval devices will not work.

Examples of prior art fish landing devices include U.S. Pat. No. 1,049,875 to Krueger, U.S. Pat. No. 1,982,132 to Boles, U.S. Pat. No. 2,235,371 to Jyrkas, U.S. Pat. No. 3,095,662 to Puckett, U.S. Pat. No. 3,123,930 to Rimar, U.S. Pat. No. 3,267,603 to Josephs et al., and U.S. Pat. No. 3,375,601 to Matthews.

BRIEF SUMMARY OF THE INVENTION

In accordance with one embodiment, the rope gaff comprises a main ring with an overlap closure, foldable rope wires, and double articulated weighted gaff hooks. The rope gaff easily slips over fishing line to be lowered down to already caught fish, where the rope gaff grips fish allowing the user to pull the fish up without the possibility of breaking the fishing rod or fishing line or losing fishing tackle or the fish.

DETAILED DESCRIPTION OF THE INVENTION

1a—main ring
1b—double articulated weighted gaff hook wires
1c—weights on gaff hooks
1d—gaff hooks
2a—rope wires
3a—double articulated gaff hooks with wires
4a—wire knot
4b—wire knot The present invention relates to fishing and is specifically directed to a device and method for retrieving already caught fish on a fishing line and fishing hook by an angler when fishing from bridges, piers, high banks and other high places. This device and method provide a new and useful way to assist in the retrieval of fish in order to lessen the risk of losing a large fish due to insufficient test strength of the fishing line or breakage of the fishing rod.

Figure 1:
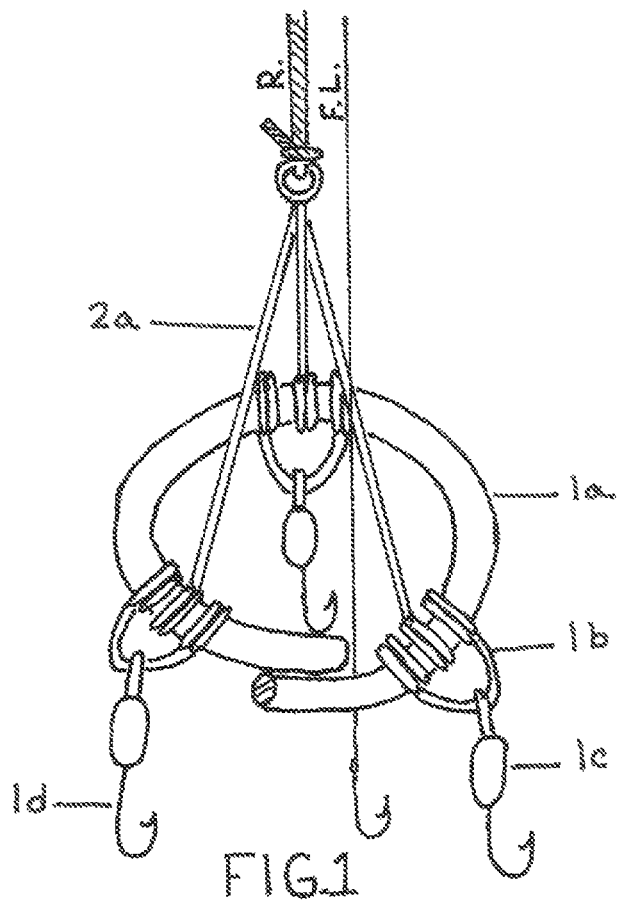
FIG. 1 is a front elevation view of the rope gaff, with the rope R and fishing line F.L. being shown.

FIGS. 1 through 4 illustrate the components in detail. As shown in FIG. 1, there is illustrated a large diameter main ring 1a with overlapping ends, where the fishing line will pass through to the center of the ring, the overlapping ends extending past each other in opposing directions so as to overlap with each other in a side by side manner. The double articulated gaff hook wires 1b allow the hooks 1d to move and grip the head of a fish to be retrieved. Weights 1c keep the gaff hooks 1d in a downward position. The gaff hooks 1d are for gripping the head of the fish. The rope R used to lower and retrieve the rope gaff and the fishing line F.L. and fishing hook are only included in FIG. 1 to show how the rope gaff appears during operation and do not form part of the present invention.

Figure 2:
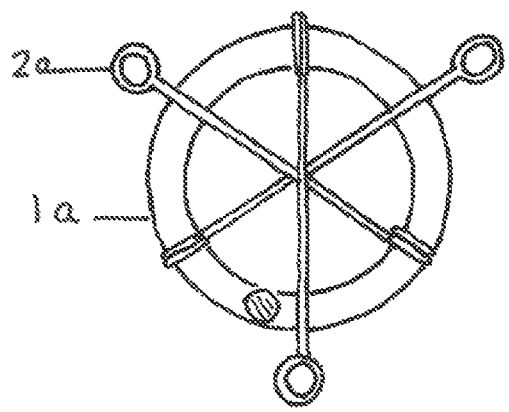
FIG. 2 is a top view of the rope gaff with rope wires folded flat without gaff hooks showing.

In FIG. 2, the rope wires 2a have loops at one end for connection to the rope R and wire knots 4a, 4b at an opposing end for pivotal attachment to the main ring 1a. These wires 2a are shown in FIG. 2 as being folded to demonstrate the ability of the rope gaff to be folded and collapsed. In FIG. 1, the rope wires 2a are shown as being open with the rope R being passed through the loops at one end during use.

Figure 3:
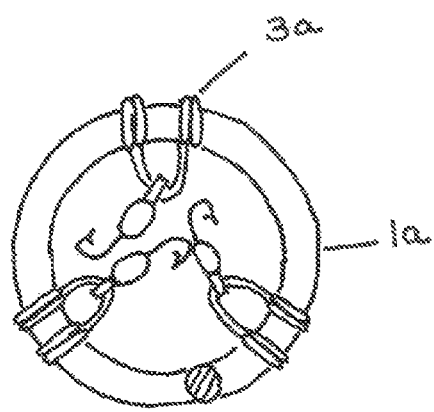
FIG. 3 is a bottom view of the double articulated weighted gaff hooks folded toward the center of the main ring without rope wires showing.

FIG. 3 shows double articulated gaff hooks 3a with weights 1c as being folded to demonstrate the ability of the rope gaff to be folded and collapsed. The double articulated weighted gaff hook wires 1b are u-shaped and have wire knots 4a, 4b at opposing ends for pivotal attachment to the main ring 1a with the opposing ends being on opposing sides of a respective end of one of the rope wires 2a attached to the main ring 1a such that the attached end of the respective rope wire 2a is positioned between the opposing ends of the double articulated weighted gaff hooks wires 1b.

Figure 4:
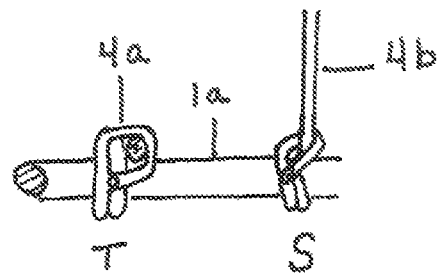
FIG. 4 is a detail view of the wire knots used in the construction of the rope gaff, wherein T represents a top view of the wire knots and S represents a side view of the wire knots.

FIG. 4 shows how the wire knots 4a, 4b are formed in top view T and side view S, to ensure secure attachment to main ring 1a. The wire knots 4a, 4b pivotally attach the rope wires 2a and double articulated gaff hooks 3a to the main ring 1a so as to allow the rope wires 2a and double articulated gaff hooks 3a to move between open and folded positions. The wire knots 4a, 4b are formed by a plurality of turns of respective end portions of the wires of the rope wires 2a and double articulated weighted gaff hook wires 1b around respective portions of the main ring 1a.

As shown in FIG. 1, a retrieval rope R is attached through the 3 loops at one end of the rope wires 2a on the topside of the device. On the main ring 1a, the fishing line F.L. is passed between a gap in the overlapping ends of the main ring 1a, so the rope R side is up and the gaff hooks 1d are oriented downwardly. The rope gaff is lowered down along the fishing line F.L., to the already caught fish on the fishing hook. Upon contact with the fish, the rope R is jigged up and down until at least one of the gaff hooks 1d grip the fish. Then the rope R is pulled back up to thus retrieve the fish and rope gaff.

It can be readily seen that the rope gaff makes it easier to retrieve large fish that have been caught from high places. Furthermore, the rope gaff lessens the concern with respect to the possibility of the breaking of the fishing rod and/or fishing line, losing tackle, or losing the fish. The rope gaff is fully collapsible making it easy to carry in a tackle box or other conveyance.

While the preferred embodiments have been fully described and depicted for the purpose of explaining the principles of the rope gaff, it will be appreciated by those skilled in the art that modification and changes can be made thereto without departing from the scope of the rope gaff.

I claim:

1. A fully collapsible rope gaff comprising:
    a round metal ring having first and second ends, the first and second ends extending past each other in opposing directions so as to overlap with each other in a side by side manner, a fishing line capable of being passed between the first and second ends so as to be located within a center of the round metal ring;
    a plurality of straight rope wires spaced equally from each other on the round metal ring, each of the straight rope wires being looped at a first end for attachment to a retrieval rope and attached at a second end to the round metal ring, the second end of each of the straight rope wires comprising a first wire knot, each of the first wire knots comprising a plurality of turns of a portion of the second end of a respective one of the straight rope wires around a portion of the round metal ring;

a plurality of u-shaped wire links equally spaced from each other on the round metal ring, each of the u-shaped wire links having first and second ends which are attached to the round metal ring, the first and second ends of each of the u-shaped wire links comprising second wire knots, the second wire knots of a respective one of the u-shaped wire links comprising a plurality of turns of portions of both the first and second ends of the respective one of the u-shaped wire links around other portions of the round metal ring, the second wire knots of the respective one of the u-shaped wire links being on opposing sides of the first wire knot of a respective one of the straight rope wires such that the first wire knot of the respective one of the straight rope wires is positioned between the second wire knots;

the first and second wire knots providing pivoting connections for the straight rope wires and u-shaped wire links with respect to the round metal ring, the pivoting connections enabling the straight rope wires and u-shaped wire links to assume first open positions and second folded positions, in the first open positions the straight rope wires and u-shaped wire links being pivoted away from the center of the round metal ring such that the straight rope wires and u-shaped wire links extend away from the round metal ring, and in the second folded positions the straight rope wires and u-shaped wire links being pivoted toward the center of the round metal ring such that the straight rope wires and u-shaped wire links extend toward the center of the round metal ring; and a plurality of gaff hooks attached to and hanging from the u-shaped wire links, one of said plurality of gaff hooks attached to and hanging from a respective one of the u-shaped wire links, the gaff hooks having weights thereon.

2. The fully collapsible rope gaff of claim 1, wherein the plurality of straight rope wires comprises three straight rope wires.

3. The fully collapsible rope gaff of claim 1, wherein the plurality of u-shaped wire links comprises three u-shaped wire links.

* * * * *